US012574265B2

(12) United States Patent
Su et al.

(10) Patent No.: US 12,574,265 B2
(45) Date of Patent: Mar. 10, 2026

(54) METHOD FOR ACCELERATING GENERATION OF VXLAN PACKET WITH HARDWARE, METHOD FOR ACCELERATING REMOVAL OF VXLAN HEADER WITH HARDWARE, AND METHOD FOR ACCELERATING MODIFICATION TO VXLAN PACKET WITH HARDWARE

(71) Applicant: REALTEK SEMICONDUCTOR CORPORATION, Hsinchu (TW)

(72) Inventors: Tsung-Yin Su, Hsinchu (TW); Ji Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 367 days.

(21) Appl. No.: 18/387,484

(22) Filed: Nov. 7, 2023

(65) Prior Publication Data

US 2024/0163134 A1     May 16, 2024

(30) Foreign Application Priority Data

Nov. 11, 2022     (TW) .................................. 111143187

(51) Int. Cl.
*H04L 12/10*          (2006.01)
*H04L 12/46*          (2006.01)
*H04L 45/74*          (2022.01)
(52) U.S. Cl.
CPC .......... *H04L 12/4683* (2013.01); *H04L 12/10* (2013.01); *H04L 45/74* (2013.01)
(58) Field of Classification Search
CPC ................................ H04L 12/10; H04L 45/74

USPC .......................................................... 370/392
See application file for complete search history.

(56) References Cited

U.S. PATENT DOCUMENTS

| 12,388,678 | B2 * | 8/2025 | Huang | .................... H04L 63/10 |
| 2017/0180273 | A1 * | 6/2017 | Daly | .................... H04L 69/324 |
| 2022/0060555 | A1 | 2/2022 | Daly et al. | |

FOREIGN PATENT DOCUMENTS

| CN | 106921592 A | * | 7/2017 | ......... H04L 12/4633 |
| CN | 104468384 B | | 1/2018 | |
| CN | 108475244 B | | 7/2022 | |

OTHER PUBLICATIONS

OA letter of a counterpart TW application (appl. no. 111143187) mailed on May 4, 2023.

* cited by examiner

*Primary Examiner* — Sibte H Bukhari
(74) *Attorney, Agent, or Firm* — WPAT, PC

(57)                  ABSTRACT

A method for accelerating the generation of Virtual Extensible Local Area Network (VXLAN) packets with an application specific integrated circuit (ASIC) includes the following steps: determining whether an original packet is an upstream packet; when the original packet is the upstream packet, determining whether the original packet is for a VXLAN egress interface; when the original packet is for the VXLAN egress interface, adding a prototype outer header to the front of the original packet and thereby generating a VXLAN packet; and after generating the VXLAN packet, determining whether to modify the content of the prototype outer header.

12 Claims, 6 Drawing Sheets

S110 — determining whether an original packet is an upstream packet

S120 — when the original packet is the upstream packet, determining whether the original packet is for a VXLAN egress interface S130 — when the original packet is for the VXLAN egress interface, adding a prototype outer header in the front of the original packet and thereby generating a VXLAN packet S140 — after generating the VXLAN packet, determining whether to modify the content of the prototype outer header of the VXLAN packet S110 — determining whether an original packet is an upstream packet S120 — when the original packet is the upstream packet, determining whether the original packet is for a VXLAN egress interface S130 — when the original packet is for the VXLAN egress interface, adding a prototype outer header in the front of the original packet and thereby generating a VXLAN packet S140 — after generating the VXLAN packet, determining whether to modify the content of the prototype outer header of the VXLAN packet

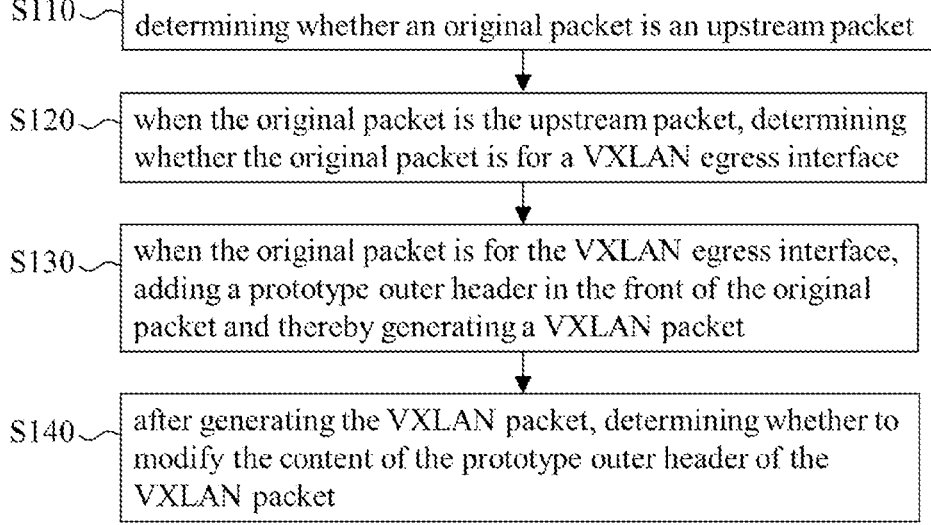

Fig. 1

| DMAC | SMAC | Ethertype | PPPoE | PPP | IPv4/ IPv6 | TCP header | Payload |
|------|------|-----------|-------|-----|------------|------------|---------|

Fig. 2 prototype outer header

| DMAC | SMAC | CVLAN | Ethertype | PPPoE | PPP | IPv4/ IPv6 | UDP | VXLAN | original packet with/without amendment |
|------|------|-------|-----------|-------|-----|------------|-----|-------|------------------|

Fig. 3

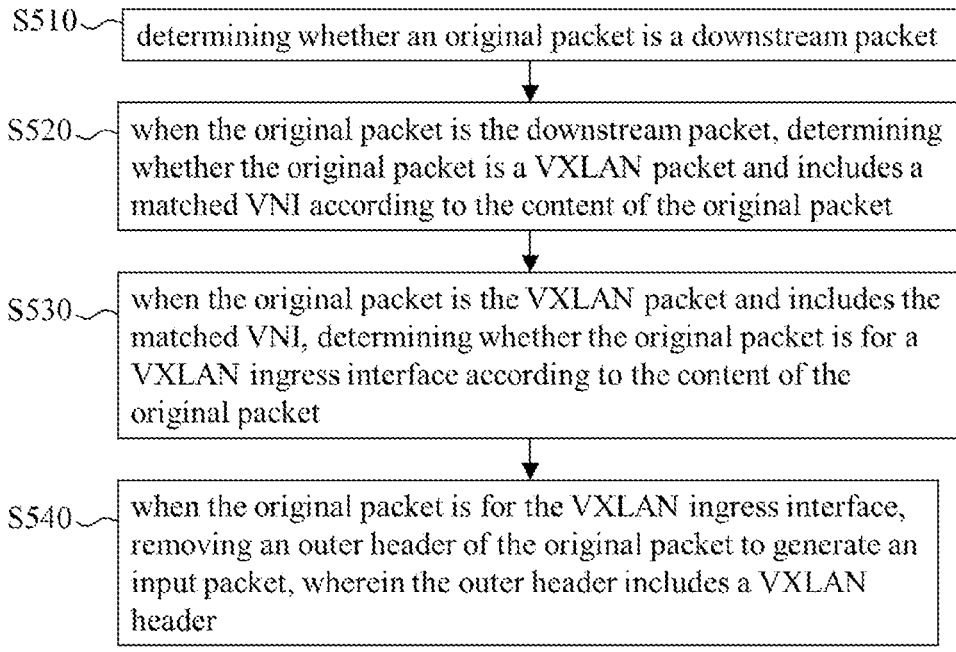

S510 — determining whether an original packet is a downstream packet

S520 — when the original packet is the downstream packet, determining whether the original packet is a VXLAN packet and includes a matched VNI according to the content of the original packet S530 — when the original packet is the VXLAN packet and includes the matched VNI, determining whether the original packet is for a VXLAN ingress interface according to the content of the original packet S540 — when the original packet is for the VXLAN ingress interface, removing an outer header of the original packet to generate an input packet, wherein the outer header includes a VXLAN header

Fig. 5

METHOD FOR ACCELERATING GENERATION OF VXLAN PACKET WITH HARDWARE, METHOD FOR ACCELERATING REMOVAL OF VXLAN HEADER WITH HARDWARE, AND METHOD FOR ACCELERATING MODIFICATION TO VXLAN PACKET WITH HARDWARE

BACKGROUND OF THE INVENTION

1. Field of the Invention

The present disclosure relates to the modification to Virtual Extensible Local Area Network (VXLAN) packets, especially to the acceleration in the modification to VXLAN packets with hardware.

2. Description of Related Art

The length of a Virtual Local Area Network (VLAN) identifier (ID) field of a VLAN header is 12 bits, and this supports $2^{12}$=4096 VLANs at most. This limited number is not enough for some application (e.g., cloud computing). In order to solve the above-mentioned problem, the Virtual Extensible Local Area Network (VXLAN) is widely used. The header of a VXLAN packet has a Virtual Network Identifier (VNI) that is equivalent to a VLAN ID. The length of a VNI is 24 bits, and this supports $2^{2}$ VLANs at most, which can satisfy most kinds of applications.

Most current arts parse packets and convert the formats of packets with software to realize VXLAN, but the software processing speed is not fast enough. Although hardware (e.g., Application Specific Integrated Circuit (ASIC)) could be used to realize VXLAN, but this is very difficult because: the VXLAN headers of downstream packets should be removed; and different VXLAN headers should be added to different upstream packets respectively. In brief, it is very difficult to perform a uniform operation to all kinds of packets with hardware.

SUMMARY OF THE INVENTION

An object of the present disclosure is to provide a method for accelerating the generation of VXLAN packets with hardware, a method for accelerating the removal of VXLAN headers with hardware, and a method for accelerating the modification to VXLAN packets with hardware.

An embodiment of the method for accelerating the generation of VXLAN packets with hardware includes the following steps: determining whether an original packet is an upstream packet; when the original packet is the upstream packet, determining whether the original packet is for a VXLAN egress interface; when the original packet is for the VXLAN egress interface, adding a prototype outer header to the front of the original packet and thereby generating a VXLAN packet; and after generating the VXLAN packet, determining whether to modify the content of the prototype outer header of the VXLAN packet.

An embodiment of the method for accelerating the removal of VXLAN headers with hardware includes the following steps: determining whether an original packet is a downstream packet; when the original packet is the downstream packet, determining whether the original packet is a VXLAN packet and includes a matched VXLAN network identifier (VNI); when the original packet is the VXLAN packet and includes the matched VNI, determining whether the original packet is for a VXLAN ingress interface; and when the original packet is for the VXLAN ingress interface, removing an outer header of the original packet to generate an input packet, wherein the outer header includes a VXLAN header.

An embodiment of the method for accelerating the modification to VXLAN packets with hardware includes the following steps: packet generation steps for accelerating the generation of an upstream VXLAN packet with the hardware; and header removal steps for accelerating the removal of a VXLAN header with the hardware. The packet generation steps include: determining whether an upstream packet is for a VXLAN egress interface; when the upstream packet is for the VXLAN egress interface, adding a prototype outer header in the front of the upstream packet and thereby generating the upstream VXLAN packet; and after generating the upstream VXLAN packet, determining whether to modify the content of the prototype outer header of the upstream VXLAN packet. The header removal steps include: determining whether a downstream packet is a downstream VXLAN packet and includes a matched VXLAN network identifier (VNI); when the downstream packet is the downstream VXLAN packet and includes the matched VNI, determining whether the downstream packet is for a VXLAN ingress interface; and when the downstream packet is for the VXLAN ingress interface, removing an outer header of the downstream packet to generate an input packet, wherein the outer header includes the VXLAN header.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 1 shows an embodiment of the method of the present disclosure for accelerating the generation of Virtual Extensible Local Area Network (VXLAN) packets with hardware.

FIG. 2 shows an example of the format of the original packet mentioned in FIG. 1.

FIG. 3 shows an example of the format of the prototype outer header mentioned in FIG. 1.

FIG. 5 shows an embodiment of the method of the present disclosure for accelerating the removal of VXLAN headers with hardware.

DETAILED DESCRIPTION OF THE PREFERRED EMBODIMENTS

Figure 4:
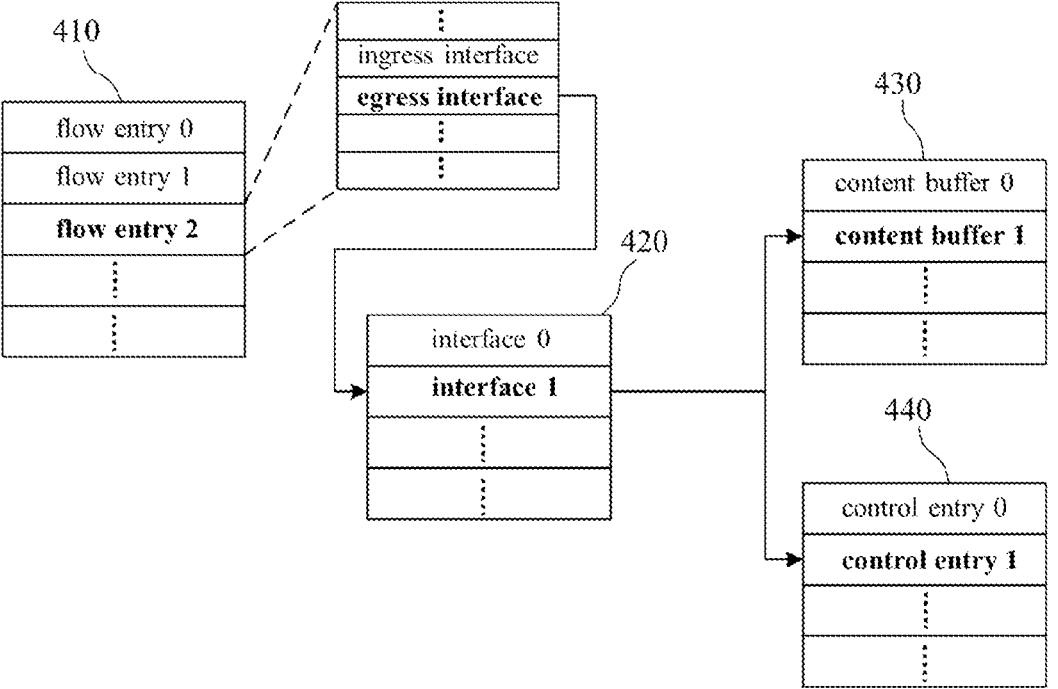
FIG. 4 shows an exemplary operation process executed by the hardware mentioned in FIG. 1.

The present specification discloses a method for accelerating the generation of Virtual Extensible Local Area Network (VXLAN) packets with hardware, a method for accelerating the removal of VXLAN headers with hardware, and a method for accelerating the modification to VXLAN packets with hardware. These methods can realize VXLAN with hardware quickly. The methods of the present disclosure are applicable to a network device (e.g., a switch or a router) which includes the above-mentioned hardware and other circuits (e.g., a CPU, a memory, a Media Access Control (MAC) circuit, and a physical layer (PHY) circuit). An embodiment of the hardware is an Application Specific Integrated Circuit (ASIC) which can be an independent circuit devoted to VXLAN or can be at least a part of some circuit (e.g., a MAC circuit) of the network device.

FIG. 1 shows an embodiment of the method of the present disclosure for accelerating the generation of VXLAN packets with hardware. The embodiment of FIG. 1 includes the following steps:

S110: determining whether an original packet is an upstream packet.

Figure 2:
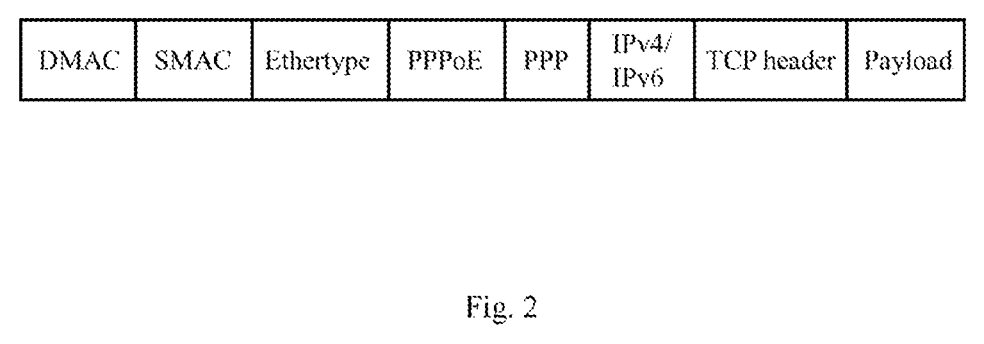

For example, S110 determines whether the original packet is transmitted from a local area network (LAN) to a wide area network (WAN); if so, S110 determines the original packet is the upstream packet. An example of the format of the original packet is shown in FIG. 2, and includes a destination MAC (DMAC) field, a source MAC (SMAC) field, an Ethertype filed, a Point-to-Point Protocol over Ethernet (PPPoE) field, a Point-to-Point Protocol (PPP) field, an Internet Protocol version 4 (IPv4) field or an Internet Protocol version 6 (IPv6) field, a Transmission Control Protocol (TCP) header field, and a payload field, but the implementation of the present invention is not limited thereto.

S120: when the original packet is the upstream packet, determining whether the original packet is for a VXLAN egress interface.

It is noted that two different original packets may be directed to two different VXLAN egress interfaces and may be respectively forwarded to different destinations; in this case, the two different original packets are related with two different content buffers of a content table (mentioned in later paragraphs) respectively and are related with two different control entries of a control table (mentioned in later paragraphs) respectively, wherein the content table and the control table are stored in the hardware, the contents (e.g., values of DMAC fields) of the two different content buffers are different and/or the contents of the two different control entries are different.

S130: when the original packet is for the VXLAN egress interface, adding a prototype outer header to the front of the original packet and thereby generating a VXLAN packet, wherein the original packet could be modified (e.g., modified to include a Customer Virtual Local Area Network (CVLAN) field).

An example of the format of the prototype outer header is shown in FIG. 3, and includes a DMAC field, a SMAC field, a CVLAN field, an Ethertype field, a PPPoE field, a PPP field, an IPv4/IPv6 field, a User Datagram Protocol (UDP) field, and a VXLAN field, but the implementation of the present invention is not limited thereto. People having ordinary skill in the art can modify the format of the prototype outer header according to the demand for implementation.

S140: after generating the VXLAN packet, determining whether to modify the content of the prototype outer header of the VXLAN packet.

It is noted that after finishing S140, the hardware can take care of the VXLAN packet with a general upstream packet forwarding process.

Referring to FIGS. 1-3, if the prototype outer header is not stored in a content table of the hardware for some reasons (e.g., the type of the original packet is new to the hardware, or the prototype outer header adequate for the type of the original packet is not prestored in the hardware), the embodiment of FIG. 1 can further include the following steps (not shown in the figures):

S122: using the hardware to acquire at least a part of the content of the prototype outer header (e.g., the content of all fields of the prototype outer header of FIG. 3) from an upper circuit (e.g., the CPU and the memory of the aforementioned network device) and/or using the hardware to generate at least a part of the content of the prototype outer header, and thereby obtaining the whole prototype outer header.

For example, the upper circuit executes software and/or firmware to generate the content of the prototype outer header. This can be realized with known/self-developed technologies and falls beyond the scope of the present disclosure.

S124: storing the prototype outer header in a content buffer of the content table for subsequent utilization, wherein the content buffer is related or devoted to the VXLAN egress interface.

For example, the content table includes a known/self-developed circuit functioning as a look-up table, and the content buffer includes one or more register(s).

Referring to FIGS. 1-3 and the preceding paragraph, in a circumstance that the prototype outer header is not stored in the hardware, the hardware may also lack specific data for determining whether to modify the content of the prototype outer header. When the hardware does not have the specific data, S140 of FIG. 1 can further include the following steps (not shown in the figures):

S142: using the hardware to acquire at least a part of multiple field values (i.e., field definition records) from the upper circuit and/or using the hardware to generate at least a part of the multiple field values, and then storing the multiple field values in multiple fields of a control entry of a control table for subsequent utilization respectively, wherein the control entry is related or devoted to the VXLAN egress interface.

For example, the upper circuit executes software and/or firmware to generate the multiple field values; the control table includes a known/self-developed circuit functioning as a look-up table; and the control entry is implemented with one or more register(s).

S144: determining whether to modify the prototype outer header of the VXLAN packet according to the control entry of the control table.

For example, the multiple field values of the control entry and their descriptions are found in the following Table 1.

TABLE 1

| field value | description |
| --- | --- |
| pppoe_len_offset | This field value indicates the address of an offset in the content buffer, wherein the offset can be used to ascertain a PPPOE length (existing in the PPPOE field of the prototype outer header) |
| pppoe_len_diff | If the pppoe_len_offset is not zero, using the sum of the present field value and the total length of the original packet to update the PPPOE length (existing in the PPPOE field of the prototype outer header) |

6

TABLE 1-continued

| field value | description |
|---|---|
| ipv4_offset | This filed value indicates the address of an offset in the content buffer, wherein the offset can be used to find an Ipv4 header. If this field value is not zero, recalculating the fields (checksum, ip length, ip dscp, and so on) in the Ipv4 header (existing in the Ipv4 field of the prototype outer header). |
| ipv6_offset | This field value indicates the address of an offset in the content buffer, wherein the offset can be used to find an Ipv6 header. |
| ip_len_diff | If the ipv4_offset or the ipv6_offset is not zero, using the sum of the present field value and the total length of the original packet to update an IP length (existing in the Ipv4/Ipv6 field of the prototype outer header) |
| ip_dscp | If the ipv4_offset or the ipv6_offset is not zero, using the present field value to update an IP Differentiated Services Code Point (IP DSCP) (existing in the Ipv4/Ipv6 field of the prototype outer header) |
| ip_ecn | If the ipv4_offset or the ipv6_offset is not zero, using the present field value to update an IP Explicit Congestion Notification ( IP ECN) (existing in the Ipv4/Ipv6 field of the prototype outer header) |
| ip_ttl | If the ipv4_offset or the ipv6_offset is not zero, using the present field value to update an IP time-to-live (IP TTL) of the Ipv6 field or update a Hop limit of the Ipv6 field (existing in the Ipv4/Ipv6 field of the prototype outer header) |
| ip_id | If the ipv4_offset is not zero, using the present field value to update an Ipv4 Identification. Every time the present field value is read, increasing the present field value by one. |
| udp_len_offset | This filed value indicates the address of an offset in the content buffer, wherein the offset can be used to find a UDP length. |
| udp_len_diff | If the udp_len_offset is not zero, using the sum of the present field value and the total length of the original packet to update the UDP length. |
| sport_offset | This filed value indicates the address of an offset in the content buffer, wherein the offset can be used to find a UDP sport (UDP source port). If the present field value is not zero, referring to flow.vxlan_sport to update the UDP sport. P.S. flow.vxlan_sport is a prestored VXLAN sport (VXLAN source port) in the flow connection of an inner-layer packet (i.e., the original packet) of the VXLAN packet, and it is obtained with hash calculation according to the messages of the second layer/third layer/fourth layer (L2/L3/L4) of the inner-layer packet. |

On the basis of the previous description, the prototype outer header includes M fields (e.g., the 9 fields of the prototype outer header of FIG. 3), wherein the M is an integer greater than one. In addition, the aforementioned step S144 includes: checking the content of K field(s) of the prototype outer header according to the multiple field values of the control entry and thereby determining whether to modify the content of the K field(s), wherein the K is a positive integer smaller than the M. An example of the K field(s) includes: a PPPoE field; an Ipv4/Ipv6 field; and a UDP field. As shown in Table 1, an example of the step of determining whether to modify the content of the K field(s) includes: determining whether a field value "pppoe_len_offset" of the PPPoE field is zero, and updating the content of the PPPoE field when the field value "pppoe_len_offset" is not zero; determining whether a field value "ipv4/ipv6_offset" of the Ipv4/Ipv6 field is zero, and updating the content of the Ipv4/Ipv6 field when the field value "ipv4/ipv6_offset" is not zero; determining whether a field value "udp_len_offset" of the UDP field is zero, and updating the content of the UDP field when the field value "udp_len_off-set" is not zero; and determining whether a field value "sport_offset" of the UDP field is zero, and updating the content of the UDP field when the field value "sport_offset" is not zero.

Referring to FIGS. 1~3, in a circumstance that "the prototype outer header has been stored in a content buffer of the content table of the hardware" and "specific data for determining whether to modify the content of the prototype outer header have been stored in a control entry of the control table of the hardware" for some reasons (e.g., the type of the original packet is known to the hardware, or the prototype outer header adequate for the type of the original packet has been prestored in the hardware), S130 of FIG. 1 acquires the prototype outer header from the content buffer and S140 of FIG. 1 includes: determining whether to modify the prototype outer header according to the control entry, wherein the control entry includes multiple fields. Since those having ordinary skill in the art can refer to the preceding paragraphs to appreciate the detail and the modification for the above circumstance, repeated and redundant description is omitted here.

FIG. 4 shows an exemplary operation process executed by the aforementioned hardware. FIG. 4 includes a flow table 410, an interface table 420, a content table 430, and a control table 440, wherein the flow table 410 includes a plurality of flow entries (i.e., the flow entry 0, the flow entry 1, and the flow entry 2, and so on in FIG. 4), the interface table 420 includes a plurality of interfaces (i.e., the interface 0, the interface 1, and so on in FIG. 4), the content table 430 includes a plurality of content buffers (i.e., the content buffer 0, the content buffer 1, and so on in FIG. 4), and the control table 440 includes a plurality of control entries (i.e., the control entry 0, the control entry 1, and so on in FIG. 4). In FIG. 4, firstly, the hardware determines that the original packet is directed to the flow entry 2 of the flow table 410 according to the information (e.g., the content, the source port, the destination port, and so on) related with the original packet, wherein the flow entry 2 includes a plurality of options including an ingress interface, an egress interface, and so on; next, the hardware determines that the original packet is directed to the egress interface of the flow entry 2 according to the content of the original packet (e.g., the source ip, the destination ip, the source port, the destination port, and layer 4 protocol, and so on); afterward, the hardware determines that the egress interface is associated with the interface 1 of the interface table 420 according to the egress interface index of the flow entry 2; and finally, the hardware determines that the interface 1 is directed to the content buffer 1 of the content table 430 and directed to the control entry 1 of the control table 440 in an one-on-one mapping manner. The above-mentioned determination can be realized with known/self-developed technologies.

FIG. 5 shows an embodiment of the method of the present disclosure for accelerating the removal of VXLAN headers with hardware. The embodiment of FIG. 5 includes the following steps:

S510: determining whether an original packet is a downstream packet.

For example, S510 determines whether the original packet is transmitted from a local area network (LAN) to a wide area network (WAN); if not, S510 determines that the original packet is the downstream packet.

S520: when the original packet is the downstream packet, determining whether the original packet is a VXLAN packet and includes a matched VXLAN network identifier (VNI) according to the content of the original packet.

S530: when the original packet is the VXLAN packet and includes the matched VNI, determining whether the original packet is for a VXLAN ingress interface according to the content of the original packet.

S540: when the original packet is for the VXLAN ingress interface, removing an outer header of the original packet to generate an input packet, wherein the outer header includes a VXLAN header.

It is noted that after the removal of the outer header, the hardware can take care of the input packet with a general downstream packet forwarding process.

Figure 6:
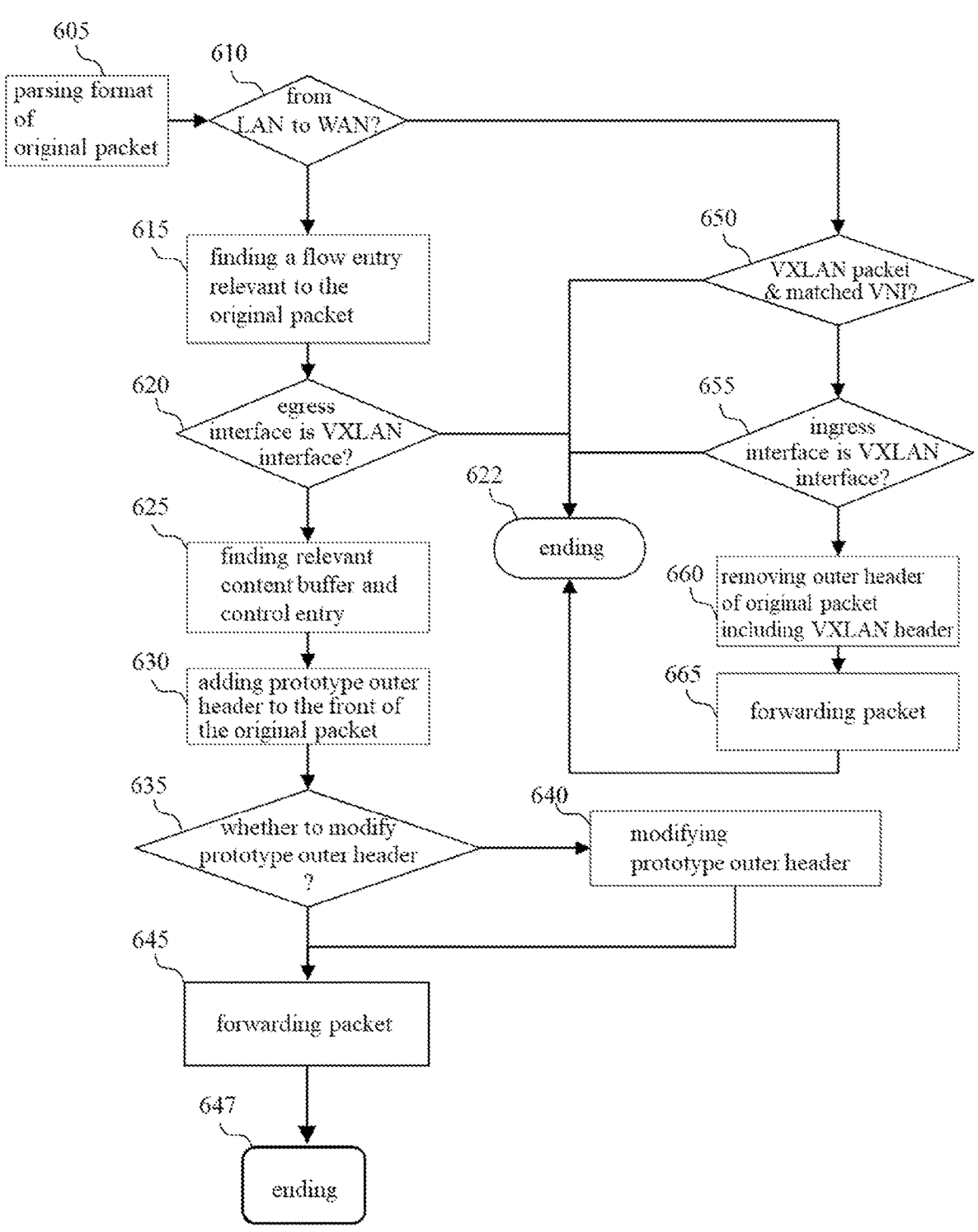
FIG. 6 shows a flow chart of a comprehensive embodiment based on the embodiments of FIGS. 1 and 5.

FIG. 6 shows a flow chart of a comprehensive embodiment based on the embodiments of FIGS. 1 and 5. FIG. 6 includes the following steps:

S605: parsing the format of an original packet.

S610: determining whether the original packet is transmitted from a local area network (LAN) to a wide area network (WAN); if so, going to S615; if not, going to S650.

S615: finding a flow entry corresponding/relevant to the original packet.

S620: determining whether an egress interface related to the original packet is a VXLAN interface according to the flow entry; if so, going to S625; if not, ending the flow (i.e., going to S622 to end the flow).

S625: finding a corresponding/relevant content buffer and a corresponding/relevant control entry.

S630: adding a prototype outer header stored in the content buffer to the front of the original packet and thereby generating a VXLAN packet.

S635: determining whether to modify the prototype outer header of the VXLAN packet according to the control entry; if so, going to S640; if not, going to S645.

S640: modifying the prototype outer header according to the control entry.

S645: taking care of the VXLAN packet according to a common upstream packet forwarding process, and then ending the flow (i.e., going to S647 to end the flow).

S650: determining whether the original packet is a VXLAN packet and includes a matched VNI; if so, going to S655; if not, ending the flow (i.e., going to S622).

S655: determining whether an ingress interface related to the original packet is a VXLAN interface; if so, going to S660; if not, ending the flow (i.e., going to S622).

S660: removing an outer header of the original packet including a VXLAN header and thereby generating an input packet.

S665: taking care of the input packet according to a common downstream packet forwarding process, and then ending the flow (i.e., going to S622).

The method of FIG. 1 and the method of FIG. 5 can be performed separately or can be combined as a comprehensive method for accelerating the modification to VXLAN packets with hardware. Since those having ordinary skill in the art can refer to the embodiments of FIGS. 1 and 5 to appreciate the detail and the modification of the comprehensive method, repeated and redundant description is omitted here.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention can be flexible based on the present disclosure.

To sum up, the present invention can accelerate the modification to VXLAN packets with hardware (e.g., ASIC). In comparison with the prior art processing VXLAN packets with software, the present invention processes VXLAN packets with hardware to achieve better performance.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method for accelerating generation of Virtual Extensible Local Area Network (VXLAN) packets with hardware, the method comprising:

determining whether an original packet is an upstream packet;

when the original packet is the upstream packet, determining whether the original packet is for a VXLAN egress interface;

when the original packet is for the VXLAN egress interface, adding a prototype outer header to a front of the original packet and thereby generating a VXLAN packet; and after generating the VXLAN packet, determining whether to modify content of the prototype outer header of the VXLAN packet, wherein the prototype outer header includes K field(s) and includes M fields, and the M is an integer greater than one, in which the K is a positive integer greater than one and smaller than the M;

the K fields include a Point-to-Point Protocol over Ethernet (PPPoE) field, an Internet Protocol version 4 (IPv4) field or an Internet Protocol version 6 (IPv6) field, and a User Datagram Protocol (UDP) field; the method includes a decision step to determine whether to modify content of the K field(s); and the decision step includes: determining whether a PPPoE length offset of the PPPoE field is zero, and updating content of the PPPoE field when the PPPoE length offset is not zero; determining whether an IPv4/IPv6offset of the IPv4/IPv6 field is zero, and updating content of the IPv4/IPv6 field when the IPv4/IPv6 offset is not zero; determining whether a UDP length offset of the UDP field is zero, and updating content of the UDP field when the UDP length offset is not zero; and determining whether a UDP sport (UDP source port) offset of the UDP field is zero, and updating content of the UDP field when the UDP sport offset is not zero.

2. The method of claim 1, further comprising: when the prototype outer header is not stored in a content buffer of a content table of the hardware, acquiring at least a part of the content of the prototype outer header from an upper circuit and storing the prototype outer header in the content buffer.

3. The method of claim 2, wherein the content buffer is devoted to the VXLAN egress interface.

4. The method of claim 2, wherein the upper circuit executes software and/or firmware to generate the at least a part of the content of the prototype outer header.

5. The method of claim 4, wherein the hardware is an Application Specific Integrated Circuit (ASIC), the upper circuit includes a central processing unit (CPU), and both the hardware and the upper circuit are included in a network switch or a network router.

6. The method of claim 2, wherein the step of determining whether to modify the content of the prototype outer header of the VXLAN packet includes: acquiring multiple field values from the upper circuit, and storing the multiple field values in multiple fields of a control entry of a control table respectively; and determining whether to modify the content of the prototype outer header of the VXLAN packet according to the control entry.

7. The method of claim 6, wherein the control entry is devoted to the VXLAN egress interface.

8. The method of claim 6, wherein the upper circuit executes software and/or firmware to generate the multiple field values.

9. The method of claim 6, the step of determining whether to modify the content of the prototype outer header of the VXLAN packet according to the control entry includes: checking the content of the K field(s) of the prototype outer header according to the multiple field values of the multiple fields of the control entry and thereby determining whether to modify the content of the K field(s), wherein the K is a positive integer smaller than the M.

10. The method of claim 1, further comprising: when the prototype outer header is stored in a content buffer of a content table of the hardware, acquiring the prototype outer header from the content buffer.

11. The method of claim 10, wherein the step of determining whether to modify the content of the prototype outer header of the VXLAN packet includes: determining whether to modify the content of the prototype outer header of the VXLAN packet according to a control entry of a control table of the hardware, wherein the control entry includes multiple field values.

12. The method of claim 11, wherein the prototype outer header includes M fields, and the M is an integer greater than one; and the step of determining whether to modify the content of the prototype outer header of the VXLAN packet according to the control entry of the control table includes: checking the content of the K field(s) of the prototype outer header according to the multiple field values and thereby determining whether to modify the content of the K field(s), wherein the K is a positive integer smaller than the M.

\*    \*    \*    \*    \*